(12) United States Patent
Brandwine et al.

(10) Patent No.: US 8,706,864 B1
(45) Date of Patent: Apr. 22, 2014

(54) BEHAVIOR MONITORING AND COMPLIANCE FOR MULTI-TENANT RESOURCES

(75) Inventors: Eric J. Brandwine, Haymarket, VA (US); Swaminathan Sivasubramanian, Seattle, WA (US); Bradley E. Marshall, Bainbridge Island, WA (US); Tate A. Certain, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 329 days.

(21) Appl. No.: 12/956,289

(22) Filed: Nov. 30, 2010

(51) Int. Cl.
*G06F 15/173* (2006.01)
*G06F 15/16* (2006.01)

(52) U.S. Cl.
USPC ............ 709/224; 709/225; 709/229; 709/232

(58) Field of Classification Search
USPC .......................................................... 709/224
See application file for complete search history.

(56) References Cited

U.S. PATENT DOCUMENTS

2003/0046396 A1* 3/2003 Richter et al. ................ 709/226
2009/0138714 A1* 5/2009 Matsushita et al. .......... 713/171

* cited by examiner

*Primary Examiner* — Faruk Hamza
*Assistant Examiner* — Abu-Sayeed Haque
(74) *Attorney, Agent, or Firm* — Novak Druce Connolly Bove + Quigg LLP

(57) ABSTRACT

The behavior of multiple users with access to a multi-tenant resource can be monitored and compliance enforced by monitoring state information for each user. The state information can be captured across a level of a network environment, such that any activity across that layer can be monitored and the data aggregated to give a global view of user behavior. If user behavior is determined to fall outside an acceptable range of behavior, any of a number of remedial actions can be taken, which can include notifying the user, billing the user for the inappropriate behavior, or modifying that behavior outside of the control of the user.

30 Claims, 6 Drawing Sheets

BEHAVIOR MONITORING AND COMPLIANCE FOR MULTI-TENANT RESOURCES

BACKGROUND

As an increasing number of applications and services are being made available over networks such as the Internet, an increasing number of content, application, and/or service providers are turning to shared-resource technologies such as cloud computing and distributed data centers. Users can be provided with access to various electronic resources through services, such as Web services, where the hardware and/or software used to support those services is dynamically scalable to meet the needs of the services at any given time. A user or customer typically will rent, lease, or otherwise pay for access to these shared resources.

Many conventional networks rely upon users to utilize a "fair share" approach, wherein each user will follow the guidelines or other agreed-upon terms for shared access to various resources. In some cases, however, users are able to modify one or more aspects of a device, resource, or network, or traffic across that network, that enables those users to obtain an unequal share of a resource. For example, a user submitting requests across a network such as the Internet might use a transmission protocol such as the Transmission Control Protocol (TCP) or the User Datagram Protocol (UDP) to transmit packets. Conventional TCP approaches rely on users ramping up traffic at a certain rate, utilizing the bandwidth at a reasonable rate, and backing off that rate in the case of a congestion event in a cooperative, shared approach. A user might instead ramp up traffic very quickly, refuse to back off due to congestion, consume an unfair amount of bandwidth, or otherwise abuse the system or otherwise operate outside compliant behavior at the expense of the other users sharing that resource. Conventional approaches are limited in their ability to monitor this behavior and make adjustments to particular user traffic to prevent unfair use and/or congestion due to an abusive user or application.

BRIEF DESCRIPTION OF THE DRAWINGS

Various embodiments in accordance with the present disclosure will be described with reference to the drawings, in which.

DETAILED DESCRIPTION

Figure 1:
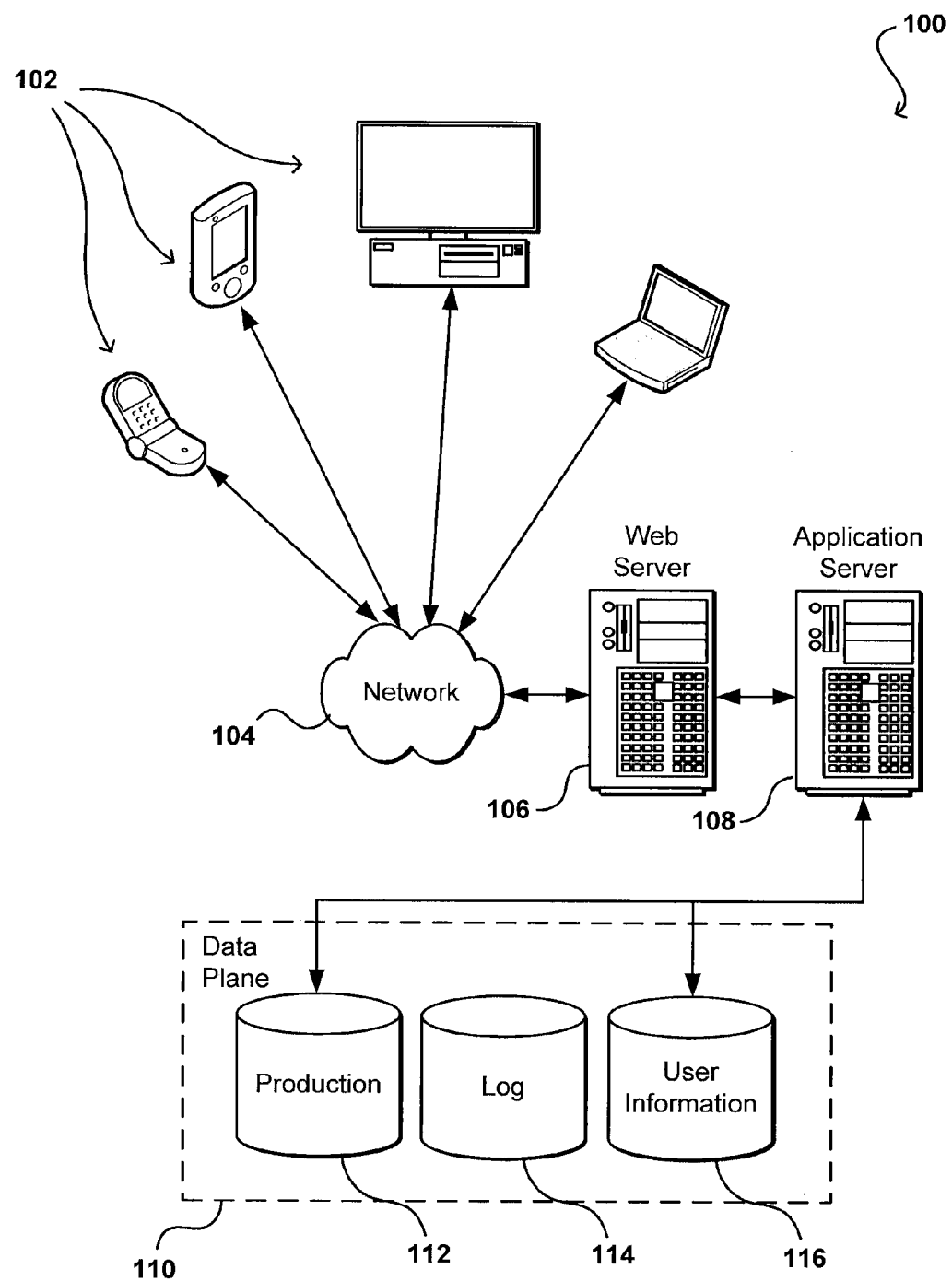
FIG. 1 illustrates an environment in which various embodiments can be implemented.

Systems and methods in accordance with various embodiments of the present disclosure may overcome one or more of the aforementioned and other deficiencies experienced in conventional approaches to managing aspects of resource sharing in a multi-tenant electronic environment. In particular, various embodiments are able to track state information for any of a number of different resources shared by one or more users (or applications, sources, or other such entities) and attempt to detect compliance with appropriate standards and/or any of a variety of resource usage guidelines (e.g., behavioral standards or other such rules or guidelines) based at least in part upon changes in that state information for a given user. If it is determined that a user is not in compliance with the system standards or guidelines, or is otherwise abusing access to at least one resource, the system can take one or more remedial actions, which can include anything from allowing the non-compliance to continue for at least a period of time to billing the user for the excess usage or modifying the behavior of that user.

In various embodiments, customers can share portions of at least one multi-tenant capable resource by accessing at least one service, such as a Web service. The usage by a user can be monitored for at least one level or layer in the system or network, wherein the components of that level or layer act as a single point of reference, such that any traffic or other action passing through that level or layer can be viewed and state determined, with that state information capable of being aggregated across multiple paths to determine an overall state of usage for a given user or user stream. If a user is not complying with specified standards or requirements, such as Internet- or TCP-specific standards or general behavioral standards specified by a provider, the system can make adjustments to that user's access that are all within those standards, such that there is no need for components on opposite sides of a network to implement, or be aware of, the remedial actions. In at least some embodiments, the behavioral standards can include any appropriate rules, guidelines, value ranges, or procedures that are selected, specified, or otherwise agreed upon by a provider or other such entity, and are not limited to specified or "official" standards that are agreed upon by any of a number of bodies, committees, organizations, etc. In the case of TCP packets, for example, the system can aggregate information for large numbers of TCP streams across a network, detect any abuse of the system or other anti-social behavior, and take a remedial action in response to detecting that abuse. In some embodiments, the user can be allowed to continue that behavior, for at least a period of time as long as no other user is adversely impacted, but in some cases can be billed extra for that excess usage.

Various types of resources and compliance can be monitored in various embodiments, such as for shared resource allocations, MX records, A records, DNS mapping, TCP standards, traffic start patterns, and traffic congestion backoff. Further, various remedial actions can be taken in response to abuse of any of these or other resource aspects. For example, the abuse can simply be noted for later processing, or the user can be notified that the behavior violated certain agreements or terms of the resource access. While some systems can choose to deny usage by that user for at least a period of time, other systems can adjust at least one aspect of the usage to be compliant with the appropriate standard, or even less than a compliant amount, such as by adjusting the user traffic to use less bandwidth than otherwise allowed.

Such a global view of the state of various resource usage can also enable the system to provide functionality beneficial to all resource users. For example, the system can determine the state of a network to determine optimal usage parameters for that network, such as the optimal packet window size for user traffic. Such an approach can enable users to quickly obtain an optimal amount of resource usage, without forcing the user to discover the optimal amount or utilize a slow ramp-up process which results in the user getting less resource usage than is otherwise allowable. Such functionality also allows a system to quickly recover from certain network events, such as congestion or temporary failure.

Various other advantages and functionality are described and suggested below with respect to the various embodiments.

FIG. 1 illustrates an example of an environment 100 for implementing aspects in accordance with various embodiments. As will be appreciated, although a Web-based environment is used for purposes of explanation, different networking environments may be used, as appropriate, to implement various embodiments. The environment includes at least one electronic client device 102, which can include any appropriate device operable to send and receive requests, messages, or information over an appropriate network 104 and convey information back to any appropriate user of the device. While the term "customer" is often used herein for purposes of explanation, it should be understood that any appropriate user of a cloud, space, resource, or service can utilize functionality described within the scope of the various embodiments. Examples of such client devices include personal computers, cell phones, handheld messaging devices, notebook computers, video game systems, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing log data 114, which can be useful for reporting, analysis, and other such uses. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for a provider such as an electronic marketplace, wherein multiple hosts might be used to perform tasks such as serving content, authenticating users, performing payment transactions, or performing any of a number of other such tasks. Some of these hosts may be configured to offer the same functionality, while other servers might be configured to perform at least some different functions. The electronic environment in such cases might include additional components and/or other arrangements, such as those illustrated in the configuration 200 of FIG. 2, discussed in detail below.

In one example where resources are shared among multiple users, applications, and/or other such sources or entities, a resource sharing service is implemented and made available over a network that enables developers, customers, or other authorized users to easily and cost-effectively utilize shared resources, such as data sources and content repositories, so that users can perform tasks such as storing, processing, and querying relational data sets in a cloud, accessing or browsing various types of content, etc. While this example is discussed with respect to the Internet, Web services, and Internet-based technology, it should be understood that aspects of the various embodiments can be used with any appropriate services available or offered over a network in an electronic environment.

A resource sharing service in one embodiment provides a separate "control plane" that includes components (e.g., hardware and software) useful for managing aspects of the shared resource. In one embodiment, a set of data management application programming interfaces (APIs) or other such interfaces are provided that allow a user or customer, via one or more sending entities, to make calls into the resource sharing service to perform certain tasks relating to the resources. The user still can use the direct interfaces or APIs to communicate with the resources (e.g., data repositories), however, and can use the specific APIs of the control plane only when necessary to manage the resources or perform a similar task.

Figure 2:
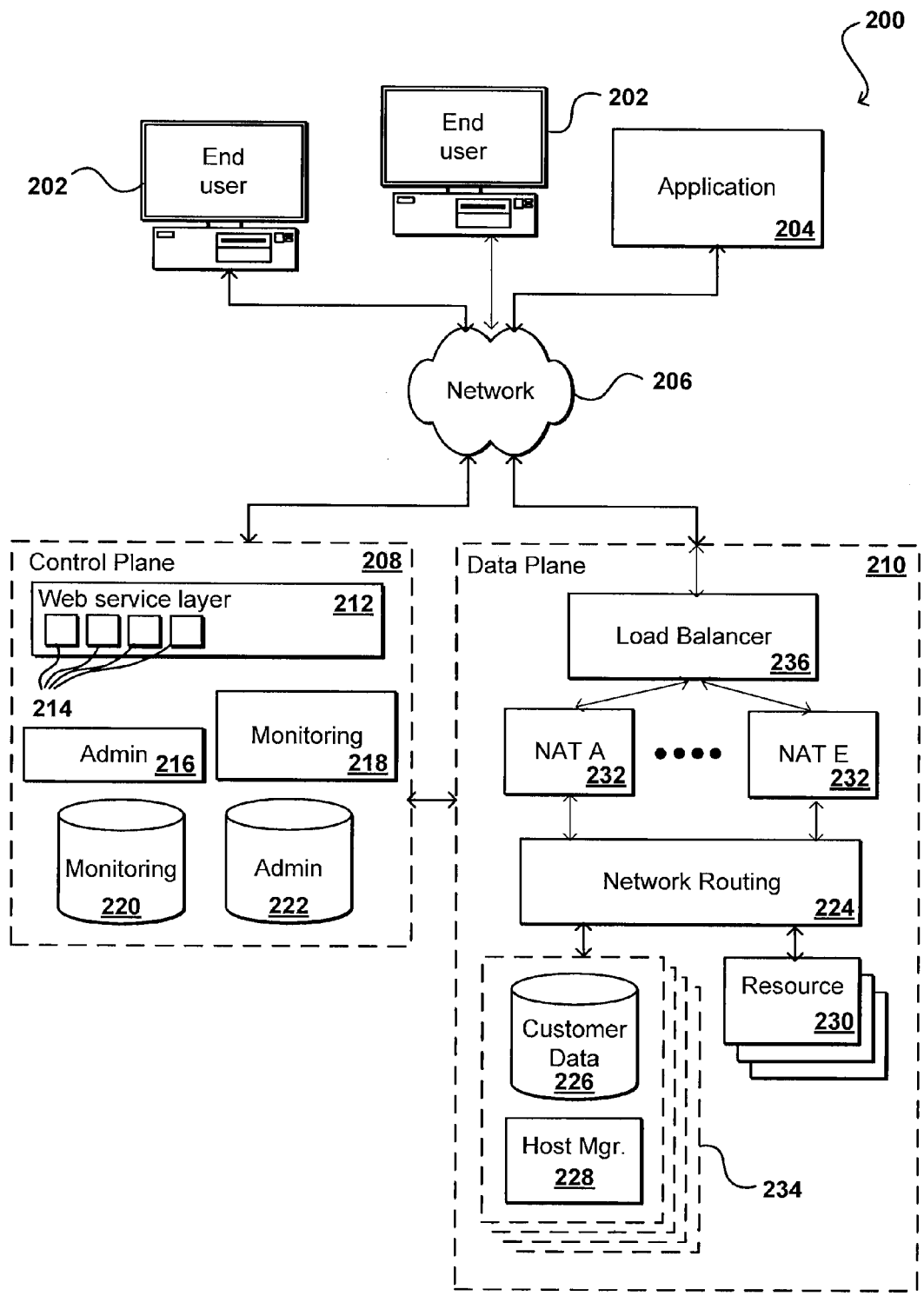
FIG. 2 illustrates an example separation of a control plane and a data plane that can be used in accordance with various embodiments.

FIG. 2 illustrates an example of a system 200 that can be used in accordance with various embodiments. In this example, computing devices 202 for a number of end users are each able to make calls through a network 206 into a control plane 208 to perform a task such as to obtain rights to access to a resource (e.g., provision a data repository) of the data plane 210. An authorized end user (or an application 204 or other entity across the network 206) can access a resource directly through an interface of a data plane 210. While an end user computing device and application are used for purposes of explanation, it should be understood that any appropriate user, application, service, device, component, entity, or resource can access the interface(s) of the control plane and/or data plane as appropriate in the various embodiments. Further, while the components are separated into control and data "planes," it should be understood that this can refer to an actual or virtual separation of at least some resources (e.g., hardware and/or software) used to provide the respective functionality.

The control plane 208 in this example is essentially a virtual layer of hardware and software components that handles control and management actions, such as provisioning, scaling, replication, etc. The control plane in this embodiment includes a Web services layer 212, or tier, which can include at least one Web server, for example, along with computer-executable software, application servers, or other such components. The Web services layer also can include a set of APIs 214 (or other such interfaces) for receiving Web services calls or requests from across the network 206. Each API can be provided to receive requests for at least one specific action to be performed with respect to the data environment, such as to provision, scale, clone, or hibernate an instance of a relational database. Upon receiving a request to one of the APIs, the Web services layer can parse or otherwise analyze the request to determine the steps or actions needed to act on or process the call. For example, a Web service call might be received that includes a request to create a data repository. In this example, the Web services layer can parse the request to determine the type of data repository to be created, the storage volume requested, the type of hardware requested (if any), or other such aspects. Information for the request can be written to an administration ("Admin") data store 222, or other appropriate storage location or job queue, for subsequent processing by an Admin component 216 or similar component of the control plane.

The control plane 208 in this embodiment also includes at least one monitoring component 218, operable to monitor aspects of the data plane and store information to a data store in the control plane, such as a monitoring data store 220. It should be understood that the monitoring data store can be a separate data store, or can be a portion of another data store such as a distinct set of tables in an Admin data store 222, or other appropriate repository. A monitoring component can access the information in the monitoring data store to determine the usage of various components or resources in the data plane 210, such as usage of the active instances 234 or customer traffic patterns as determined by various NAT devices 232. A monitoring component also can perform other tasks, such as collecting log and/or event information from multiple components of the control plane and/or data plane. A monitoring component can also monitor the health of any or all running resources and/or instances of the data plane, detect the failure of any of these components, and initiate the appropriate recovery process(es).

In this example where resources can include customer instances, each instance 234 in the data plane can include at least one data store 226 and a host manager component 228 for the machine providing access to the data store. The monitoring component can communicate periodically various components, such as the load balancer 236, each NAT device 232 or each host manager 228, such as by sending a specific request or by monitoring heartbeats from those component, to determine status, usage, or other such information.

As discussed, once a user is able to access a resource and is provided with an appropriate address (e.g., a DNS address), the user can send requests "directly" to resources in the data plane 210 through the network 206. In one embodiment, the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as instance or availability failures, for example, can be masked by programmatically remapping a DNS address to any appropriate replacement instance for a use. A request received from a user 202 or application 204, for example, can be directed (through an optional load balancer 236 or routing component) to a network address translation (NAT) router 224 (referred to as a "NAT device" herein), or other appropriate component, which can direct the request through appropriate network routing 224 to a customer instance 234, data store, host, or other resource 230 corresponding to the DNS of the request. As discussed, such an approach allows for resources to be dynamically moved, updated, replicated, etc., without requiring the user or application to change the DNS or other address used to access the instance. Further, user requests can be routed as necessary using any appropriate load balancing or distribution algorithm.

As discussed above, many users or other sending entities can submit requests or otherwise send data packets to the data plane 210 that will be directed to, and pass through, one of the NAT devices based at least in part upon an address of the request or packet. Many conventional systems rely on the fact that these users will behave in a similar fashion, at least within a set of rules specified for submitting and receiving requests from resources in the data plane, as well as utilizing various shared resources in the data plane environment. For example, when using a transmission protocol such as TCP or UDP, the protocol algorithms will typically attempt to start with a relatively low rate of packet transmission, and increase that rate at particular pace in order to enable the user to obtain a desired or allowed rate of traffic without overwhelming the network components or otherwise causing congestion, which can result in problems such as packet loss. If the network becomes congested, the network relies upon each user to reduce the transmission rate by a minimum amount until the congestion is cleared, and then slowly increase the transmission rate again at the appropriate pace. Such an approach enables each user to obtain a "fair" portion (e.g., the amount for which that user is paying) of a network resource (e.g., a data pipe) without overwhelming that resource. In a steady state, fair share approach, for example, each user can obtain a substantially even portion of the resource, while in other approaches users might be apportioned based upon some other factor, such as a type or amount of access paid for by that user. In any of these cases, however, the network components typically rely upon the user to perform transmission increases and decreases according to set guidelines in order to balance the access appropriately between users.

In some instances, however, a user might decide not to follow these guidelines in an attempt to consume a larger or otherwise unfair portion of the resource. For example, a user might not ramp up slowly but instead start transmitting packets with a very high rate, which can enable that user to consume a significant portion of the available bandwidth or other such capacity, which can adversely affect the available bandwidth or capacity available for other users. For at least some protocols or other technologies, there can be functionality that attempts to enforce at least some of these guidelines. For example, the TCP stack is configured to automatically handle the appropriate increases and decreases in packet transmission rate. In many cases, however, a user can modify or bypass this functionality, such as to enable TCP acceleration or otherwise obtain a larger share than otherwise should be obtained.

Figure 3A:
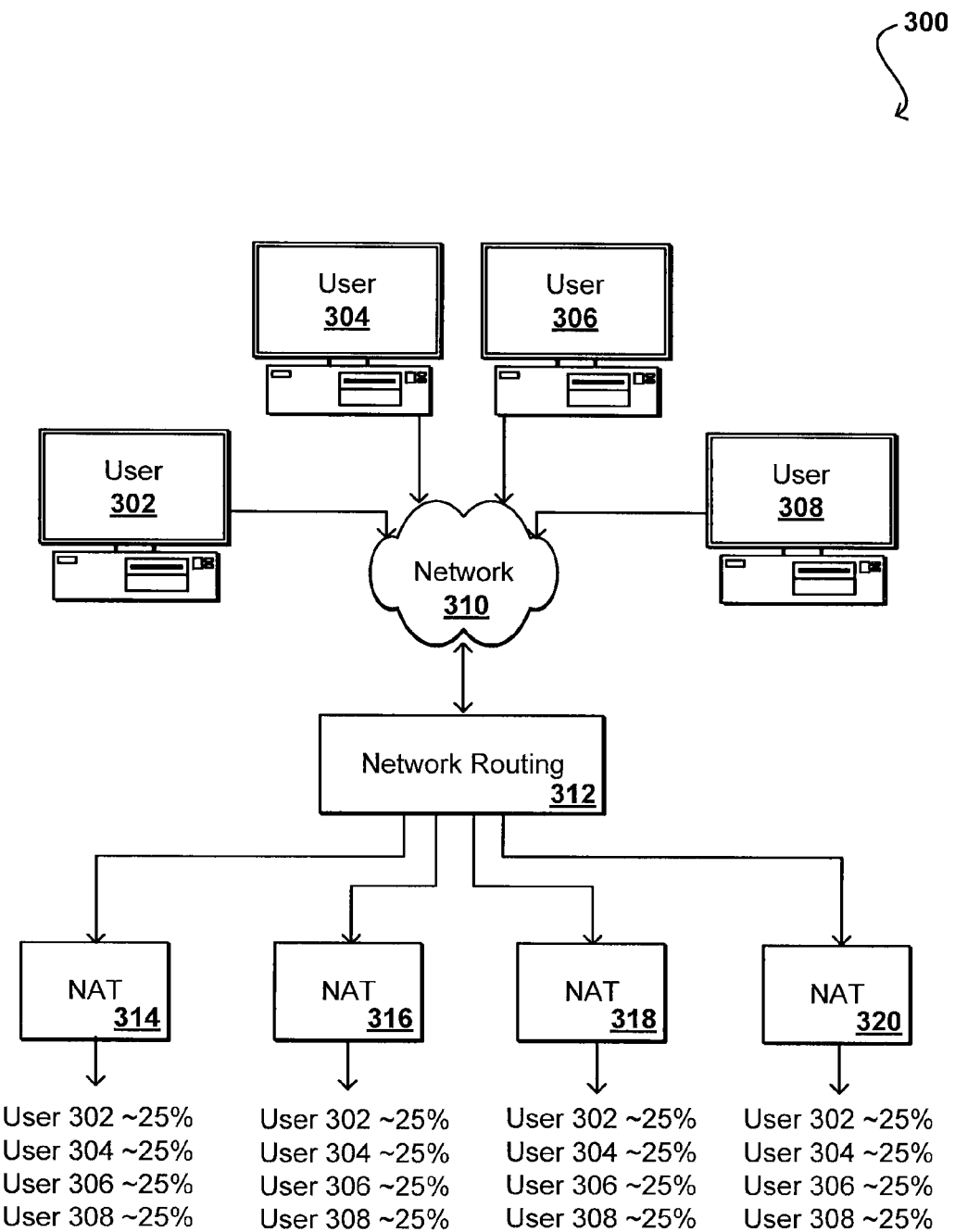
FIGS. 3(a) and 3(b) illustrate shared usage of a set of data pipes that can be utilized in accordance with various embodiments.

Consider the example system of FIG. 3(a). In this example, there are four users 302, 304, 306, 308 sending traffic across a network 310 to be received by at least one resource (not shown), where the traffic is directed by network routing 312 along one of four paths, each path having a separate NAT device 314, 316, 318, 320. In a conventional operation where the routing relies upon a fair share or similar load balancing approach, each user can have packets spread relatively evenly across the four paths, such that each user will on average consume about 25% of the traffic flowing through each NAT device, with each user and each path receiving a similar rate and amount of transmission over time. If each user is exhibiting protocol compliant behavior, for example, the traffic should flow relatively smoothly with little chance for a congestion event barring a separate problem with the network, resource, etc.

Figure 3B:
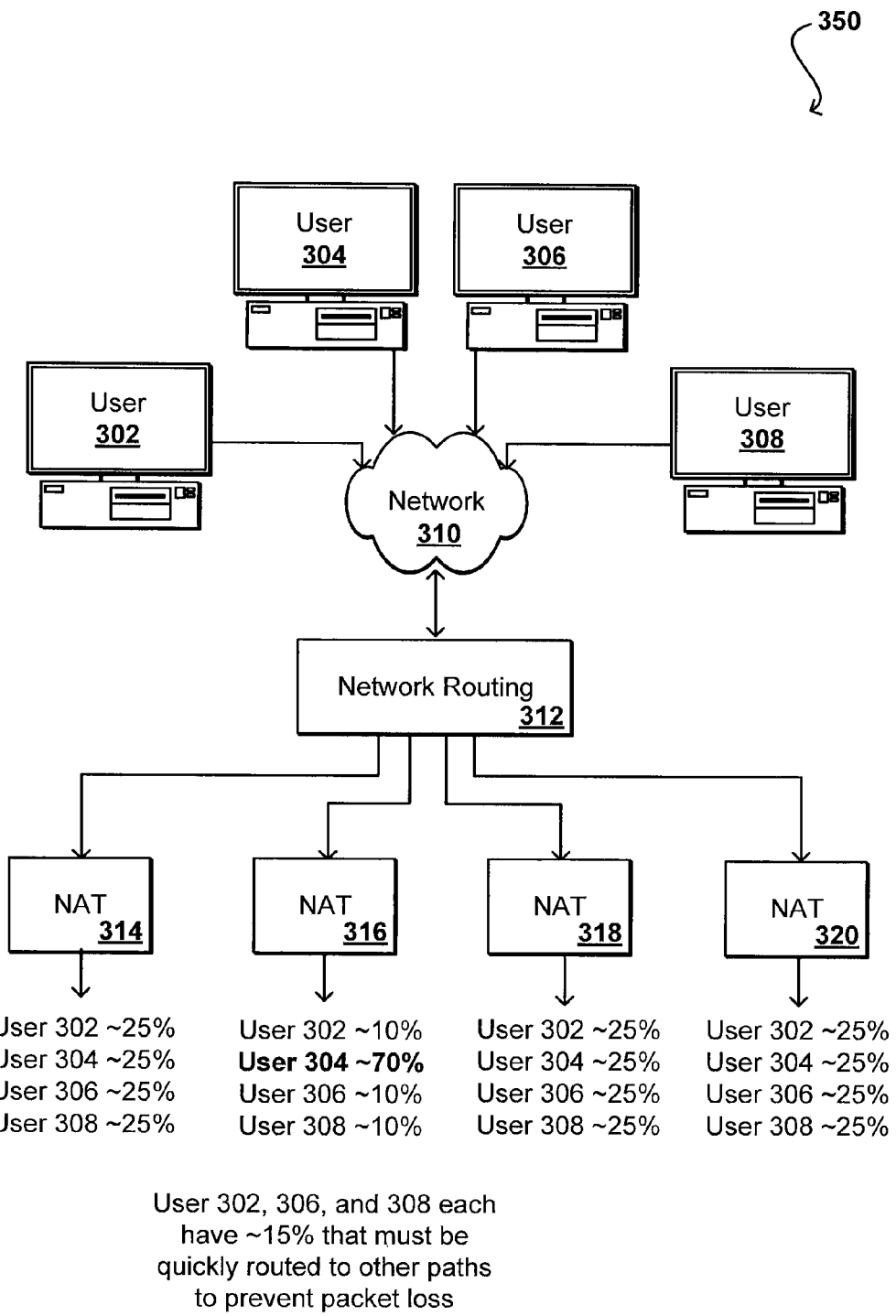

In the situation of FIG. 3(b), however, user 304 has adjusted packet transmission such that the user is suddenly occupying 70% of the available transmission capacity of NAT device 316, such that the other users are only able to obtain, on average, about 10% of the capacity of that NAT device. Placing such a substantial load on that path can result in congestion, causing the other users to experience packet loss long before the paths through devices 302, 306, and 308 can be fully loaded and/or the packet flow redistributed. In this case, there might be about 15% of the traffic that previously would have gone through NAT 316 for each user that would need to be rerouted.

Systems and methods in accordance with various embodiments can take advantage of the fact that such a network environment or data plane can include components that provide high visibility into any traffic, movement, or access to various resources. The high level of visibility can detect potentially abusive behavior and adjust the behavior as appropriate. In some embodiments abusive behavior can be detected by determining a current state of user action, while in other embodiments abusive behavior might be detected by determining a change in state that exceeds an allowable state. Such a system can also deal with the abusive behavior in a number of ways, such as by cutting off user access, slowing user access, allowing the abusive access for at least a period of time, or billing the user for the excess usage, among other options.

As an example, refer back to the example wherein users are submitting packets of information to a data plane resource, as illustrated in FIG. 2. For a transmission protocol such as TCP, a component of the data plane 210 can be configured to determine state information for a user, which can be cached locally in the data plane or transmitted to a management or monitoring component in the control plane 208. In at least one embodiment, such a system can determine state information for user traffic at the NAT level. In FIG. 2, there are a number of NAT devices 232 that in this example should receive substantially equal amounts of traffic as directed by the load balancer 236. By aggregating state information from each NAT device 232, a component such as a monitoring component 218 of the control plane 208 can determine changes in state for user behavior, determine whether those changes exceed an allowable change amount, and if so determine whether to take at least one remedial action.

The NAT devices 232 can be configured to operate in a symmetric manner to manage both incoming communications from across the network and outgoing communications, handing any necessary internal/external address mappings. An example of a NAT device is a Linux-based NAT router including a pair of high capacity network interface cards (NICs) and having two ports, an input port and an output port. The NAT devices can be designed to be horizontally scalable with respect to network traffic, and can support a fast NAT-map update rate. Network packets can come into an initial router or load balancer, and be directed to one of the NAT devices, which will perform any address mapping and forward the packets to the appropriate data plane resource address. Distributing the packets across multiple NAT devices can provide reliability in the case of failure, in addition to horizontal scalability.

In the present embodiment, each NAT device can detect state information for user traffic. For example, a NAT device 232 can determine the window size for a packet that passes through that device for a given user. The NAT device can also determine the state for any subsequent packet for that user, such as by determining the window size for the next received packet. The NAT device can potentially determine other state information as well, such as whether there was a packet lost for the user, whether there was a retransmission, etc. This information can be sent from each NAT device to a common component, such as a monitoring component 218 of the control plane 208, which can aggregate the information to determine the state of subsequent packets for a user regardless of which NAT device received the packet. At a level such as the NAT level, the system can ensure that each user packet goes through one of those devices, such that a change in state can substantially always be determined. As should be understood, such detections and/or determinations can be made at other levels or layers in the system as well, such as at the network switch level.

Figure 4:
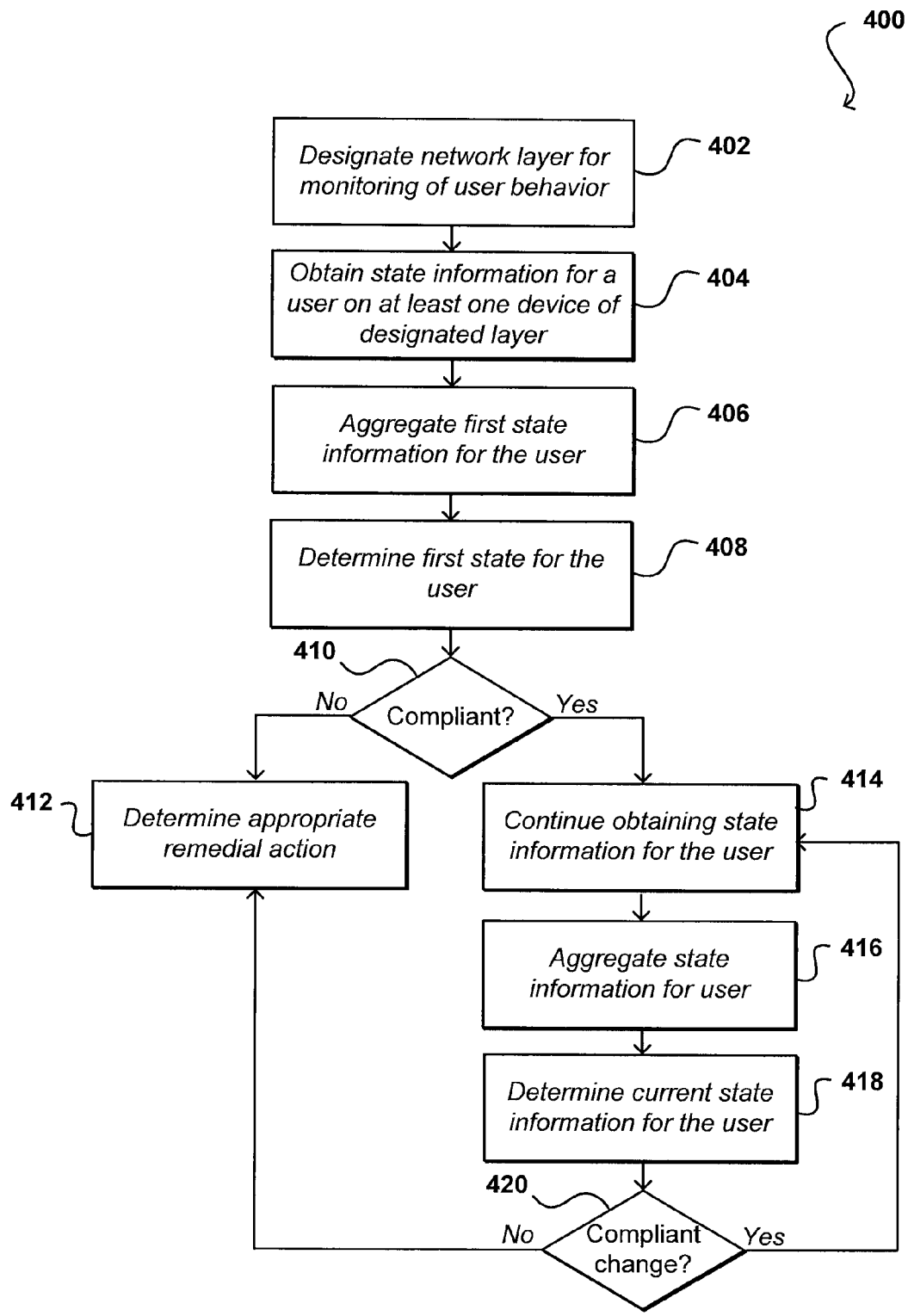
FIG. 4 illustrates an example process for regulating user behavior based upon changes in state information for shared resources that can be utilized in accordance with one embodiment.

FIG. 4 illustrates an example process 400 that can be used to monitor user behavior in a multi-tenant system that can be used in accordance with various embodiments. In this example, at least one network layer is designated and/or configured to monitor user behavior 402. As discussed, this could be at the NAT level, switch level, instance level, or other appropriate level or layer in the network. During operation, state information for various users can be obtained by the devices in the designated level 404, and first state information can be aggregated for each user 406 from the various devices at that level such that a first state for that user can be determined 408. As discussed elsewhere herein, the first state can correspond to at least one initial usage parameter for a user, such as an initial packet window size, initial number of connections, etc. The determined first state for the user can then be compared with one or more standards, requirements, guidelines, thresholds, or other such criteria discussed elsewhere herein to determine whether that first state for the user is compliant 410. If the first state is not compliant, the system can determine an appropriate remedial action 412, such as to notify the user of the non-compliance or somehow alter the behavior of that user.

If the first state is compliant, the system can continue obtaining state information for that user at the designated level 414, and for at least some subsequent time periods can aggregate state information for that user 416 and determine a current state for the user 418. The current state can be compared to previous state information, in order to determine whether the change in state over that period of time is also compliant 420. If so, the monitoring process can continue. If the change is not compliant, the system can determine an appropriate remedial action as discussed above.

In the example of packet transmission monitoring, obtaining state information for subsequent packets enables the system to determine a rate of transmission increase for a user, change in packet window size, initial transmission rate, and other such information that can be indicative of abusive behavior. Further, the system can determine whether the user backs off traffic by an appropriate amount after a congestion event, and whether the user increases the transmission rate after the event by an amount in excess of the allowed amount or rate of increase. Such detection can be done for traffic in one or both directions, as long as the traffic goes through a single point or group of points that can be monitored concurrently.

In one embodiment, the system components can use the current state of each user to determine expected transitions or changes in state for a given user. For example, if there is a missed packet and retransmission, the system might anticipate that the packet window for a user would decrease in size, there would be a retransmitted packet, and there would be a gradual increase in the size of the packets received by that user over a given stream. The expected state information then can be compared to the state of packets actually received by the user over that stream. If the actual state is different from the expected state, by any amount or by at least a minimum amount, then the system might determine that the user's behavior is potentially abusive, and can determine whether or not to take remedial action.

A remedial action in various embodiments can be any action deemed appropriate to handle a user exceeding an allowed usage rate or otherwise exhibiting non-compliant behavior, as may be based on factors such as the type or level of abuse, type of user or resource, or other such factors. For packet transmission, for example, the remedial action might include sending at least an initial message or other communication to the user informing them that the usage does not comply with the system rules or requirements, etc. Another remedial action might be to track the excess usage and bill that user for the excess usage, either at a standard or an increased rate with respect to normal usage. In some embodiments, a remedial action might be to take note of the behavior and not take further action unless there is a pattern of system abuse. Another action might be to allow the behavior as long as the behavior does not adversely impact any other users of the system.

For users who are excessively abusing the system, whether by rate, frequency, or some other metric, the system could take other types of action. For example, if a user continually exceeds specified transmission criteria despite several warnings then the traffic for that user could be directed to a slower data pipe, or other resource capable of providing a lower level of service. In other embodiments, the packets for the user could potentially be modified "in flight," or between the user and the target resource. For example, a user could advertise to others that the user is able to receive traffic with a 4 MB window size, but user packets could be altered in the network components to be segmented or otherwise altered according to network standards, such as to comply with standard TCP requirements. Further, the information ultimately received by the other could indicate that the user can accept traffic with a smaller window size, such as 16 KB. In this way, the user can be prevented from abusing the system in at least certain ways, but can still receive the level of access or usage for which that user paid, and that can comply with network standards. Abuse of window size can be particularly problematic for situations such as long data pipes (e.g., transcontinental pipes) with high bandwidth where an abusive user can easily transmit more data than would be possible using a typical TCP window or other such transmission size.

Figure 5:
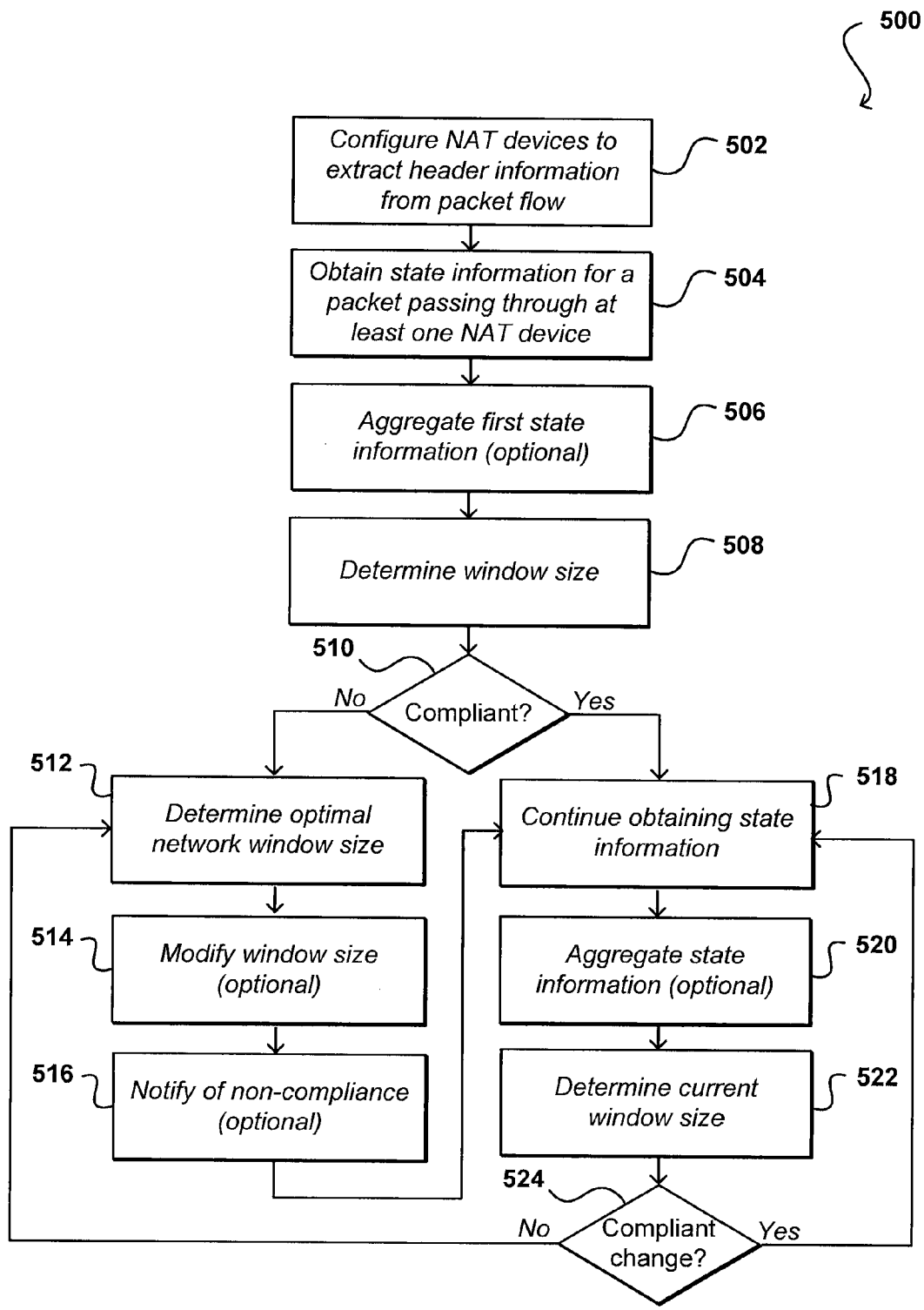
FIG. 5 illustrates an example process for ensuring acceptable user behavior with respect to network traffic transmission that can be used in accordance with one embodiment.

FIG. 5 illustrates an example of a specific process 500 for detecting and addressing improper user behavior in the form of at least one user utilizing an improper transmission window size in accordance with one embodiment. Each NAT device of a network environment (e.g., a data plane) can be configured to extract header information from a packet 502, and can use this header information to obtain state information for any user packet passing through one of the NAT devices 504. As discussed elsewhere herein, state information can include latency metrics for any of multiple connections (e.g., millions) to and from the network environment, window sizes for user streams, and other such aspects. As discussed, there can be many NAT devices positioned between an internal network environment and an external environment, such as the Internet, and components such as the NAT devices can enable the system to monitor, view, or "sniff" packets that pass through that component. In some embodiments the sniffing can be done for each packet, while in other embodiments there can be a random sampling of some other subset determined. A NAT device can have many state machines operating to perform such monitoring for the various flows corresponding to that device. The state information then can be stored for that user stream, whether at the NAT device, on another device in the data plane, or on a device in the control plane.

In this example, a user would typically send a number of initial frames and wait for an acknowledgement as part of a slow start. For each acknowledgement that the user receives back, the user is allowed to send a certain number of initial frames in order to ramp up the usage at a particular rate with respect to the performance of the network. For each packet analyzed in this example, TCP state information can be determined, which can include extracting fields or information from the packet headers. This first state information for a given user from any NAT device can be aggregated 506 for the initial set of frames in an attempt to determine a window size utilized by a given user along any user stream 508. For the first state information, the system can determine if the user state is compliant with network standards 510, such as where the initial window size does not exceed an allowable initial window size. In this example, if the window size is not compliant the system can determine the optimal window size for the network based on current conditions 512 and can set that window size for streams corresponding to that user 514. In this example, the system can also notify the user of the non-compliance 516, potentially including another copy of the guidelines or terms of use. As discussed elsewhere herein, various other remedial actions can be taken as well within the scope of the various embodiments.

If the initial state for the user is compliant, the system can continue obtaining state information for that user 518, such as by monitoring the current window size for various packets for the user, and aggregate the current state information 520 in order to determine the current user window size across the system 522. The current window size can be compared to the previous window size, or an estimated window size as discussed elsewhere herein, in order to determine whether any changes in the size (or non-changes in size) are compliant 524. For example, the system can determine whether the user increased the window size more quickly than is allowed, or if the user did not reduce window size by an appropriate amount in response to a congestion event. If any changes are compliant, the system can continue operation. If a change is not compliant, the network can determine the optimal window size and make adjustments as discussed above.

In some embodiments, the window size for packets could be set from a central authority (e.g., a control plane monitoring component) for any or all users, for specific resources or any type of resource. For example, a control plane component could utilize an algorithm to determine optimal window size based on current system usage or state. The control plane component could then set the window size to an optimal value for each user. Such an approach not only prevents users from having to discover the optimal size, but enables the users to obtain greater amount of usage since the user does not have to start from a conservative window size and increase slowly over time, for example, which causes the user to utilize less resource capacity than was otherwise available. For example, instead of starting with a standard 16 KB window and slowly approaching the bandwidth cap, for example, a user might be able to start with an optimal 64K window size based on current network conditions, as set by a network component.

Such an approach can create a very accelerated network, as window sizes are determined automatically based on current usage patterns. The system can also predict congestion events and make adjustments to reduce the traffic from at least certain users and prevent (or at least minimize) the congestion. In the case of a network event or a sudden surge in traffic, such that the available bandwidth goes down, such an approach can avoid congestion collapse as well.

Approaches in accordance with various embodiments can detect other abusive states as well. For example, a user might attempt to open multiple connections between two locations, such as by opening four concurrent TCP connections to attempt to derive additional bandwidth. In systems without a centralized state determination approach, such usage may be difficult to detect. For systems where the aggregated state of user traffic can be captured, such as by using monitoring at the NAT level, the system can detect the higher usage (e.g., the abusive additional connections) and can take remedial action as discussed elsewhere herein.

There are various other type of abuse that can be monitored as well, such as any type of shared usage that relies substantially upon a cooperative load balancing or fair share approach. These can include, for example, attempting to circumvent allowances on mail exchanger (MX) records or round robin DNS allocations. For example, if a user has failed to query DNS for an extended period of time, such that the user is continually sending traffic via the same path or resource (i.e., bypassing load balancing), the system might perform a DNS lookup on behalf of the user and install a NAT roll or other such process, which can cause an automatic DNS switch for the user. The system might also monitor the return for the original DNS response for a packet to determine the actual the actual "time to live" or TTL, which is an indication of the number of "hops" between networking devices (e.g., routers) for the packet. In some embodiments, the user might increase the TTL of the packet such that the packet could pass between many devices before being discarded, which could create congestion in the network due to extra packets that are bouncing around in the network.

In some embodiments, components such as NAT devices can report on various statistics or metrics, such as conventional TCP statistics, on a per-destination or other such basis. Such an approach can utilize boundaries that are already established for latency monitoring, for example. The statistics can be reported to a central service, which could store a wealth of information of the entire Internet as viewed from this a single point. The NAT devices then can subscribe to a feed of this information from the service, such that the NAT device can have some idea (globally) of current bandwidth and availability metrics, and attempt to apply traffic shaping via a process such as TCP header manipulation. Such an approach can be used to ensure that users scale up quickly to consume the available bandwidth, but can prevent overexpansion in order to prevent issues such as congestion and packet loss.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s)

also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of ensuring compliance with network standards, comprising:
    under control of one or more computer systems configured with executable instructions,
        extracting header information for at least one packet for a sending entity passing through a level of a network environment;
        determining first state information with respect to at least one protocol parameter for the at least one packet;
        if the first state information violates a network standard, performing at least a first remedial action with respect to the sending entity;
        determining second state information with respect to the at least one protocol parameter for at least one subsequently received packet for the sending entity passing through the level of the network environment;
        determining whether the second state information violates the network standard;
        comparing the second state information for the sending entity and predicted state information with respect to the at least one protocol parameter, the predicted state information determined using the first state information;
        determining whether the second state information conforms to the predicted state information based on the comparison; and
        based on a determination that the second state information violates the network standard and a determination that the second state information does not conform to the predicted state information, performing at least a second remedial action with respect to the sending entity.

2. The computer-implemented method of claim 1, further comprising:
    aggregating the first state information for the sending entity across network devices at the level of the network environment before determining whether the first state information violates the network standard.

3. The computer-implemented method of claim 1, further comprising:
    aggregating the second state information for the sending entity across network devices at the level of the network environment before determining whether the second state information violates the network standard.

4. The computer-implemented method of claim 1, wherein the at least one-protocol parameter includes at least one of a window size, number of connections, a time to live value, a back-off delay, and a latency value.

5. The computer-implemented method of claim 1, wherein the network standard includes at least one of a maximum window size increase or a minimum window size decrease.

6. The computer-implemented method of claim 1, further comprising:
    based on both the determination that the second state information violates the network standard and a determination that the second state information conforms to the predicted state information, performing at least one third remedial action with respect to the sending entity.

7. The computer-implemented method of claim 6, wherein the at least one third remedial action includes at least one of: allowing violation of the network standard for at least a period of time, notifying the user of the violation, tracking violation of the network standard by the user, billing the user an additional amount based at least in part upon the violation, denying the user access to the shared resource for at least a minimum period of time, denying non-compliant accesses and allowing compliant accesses by the user to the shared resource for at least a minimum period of time, denying a portion of the access requests for at least a minimum period of time, adjusting the user access to be in compliance with the network standard, and adjusting the user access to provide less access than is allowable with the network standard.

8. The computer-implemented method of claim 6, wherein the performed at least one third remedial action is performed instead of the at least one second remedial action.

9. A computer-implemented method of enforcing behavior standards for users of a shared resource, comprising:
under control of one or more computer systems configured with executable instructions,
determining first state information with respect to at least one protocol parameter for usage of a shared resource by a user, the first state information capable of being aggregated from multiple devices providing access to the shared resource;
subsequent to determining the first state information, determining second state information with respect to the at least one protocol parameter for usage of the shared resource by the user, the second state information further capable of being aggregated;
comparing the second state information for the user and predicted state information with respect to the at least one protocol parameter, the predicted state information determined using the first state information; and
based on a determination that the second state information violates a behavior standard for the shared resource and a determination that the second state information does not conform to the predicted state information, performing at least one first remedial action for the user with respect to the shared resource; and
based on the determination that the second state information violates the behavior standard for the shared resource and a determination that the second state information conforms to the predicted state information, performing at least one second remedial action for the user with respect to the shared resource.

10. The computer-implemented method of claim 9, wherein the at least one first remedial action and the at least one second remedial action include tracking violation of the behavior standard by the user and billing the user an additional amount based at least in part upon the violation.

11. The computer-implemented method of claim 10, wherein the additional amount is determined at a standard rate or an increased rate with respect to resource access by the user.

12. The computer-implemented method of claim 9, wherein the at least one second remedial action includes allowing violation of the behavior standard for at least a period of time.

13. The computer-implemented method of claim 9, wherein the at least one first remedial action or the at least one second remedial action include denying the user access to the shared resource for at least a minimum period of time.

14. The computer-implemented method of claim 9, wherein the at least one first remedial action or the at least one second remedial action include denying non-compliant accesses and allowing compliant accesses by the user to the shared resource for at least a minimum period of time.

15. The computer-implemented method of claim 9, wherein the at least one first remedial action or the at least one second remedial action include denying a portion of the access requests for at least a minimum period of time, the portion capable of varying over time.

16. The computer-implemented method of claim 9, wherein the at least one first remedial action or the at least one second remedial action include determining a current behavioral standard for the shared resource and adjusting the user access to be in compliance with the current behavioral standard.

17. The computer-implemented method of claim 9, wherein the at least one first remedial action or the at least one second remedial action include determining a current behavioral standard for the shared resource and adjusting the user access to provide less access than is allowable with the current behavioral standard.

18. The computer-implemented method of claim 9, wherein the first state information and second state information are aggregated by a monitoring component, the monitoring component further operable to perform the comparison.

19. The computer-implemented method of claim 9, wherein if the first state information violates the at least one behavior standard, one or more remedial actions are performed before the second state information is determined.

20. The computer-implemented method of claim 9, wherein the multiple devices include a plurality of network address translation (NAT) devices.

21. The computer-implemented method of claim 9, wherein state information is determined for a sampling of user access.

22. A system for enforcing behavior standards for users of a shared resource, comprising:
a processor; and
a memory device including instructions that, when executed by the processor, cause the system to:
determine first state information with respect to at least one protocol parameter of a protocol for accessing at least one shared resource by a user, the first state information capable of being aggregated from multiple devices providing access to the shared resource;
subsequent to determining the first state information, determine second state information with respect to the at least one protocol parameter of a protocol for accessing the at least one shared resource by the user, the second state information further capable of being aggregated;
compare the second state information for the user and a predicted state information with respect to the at least one protocol parameter, the predicted state information determined using the first state information;
perform at least one first remedial action for the user with respect to the shared resource when the first state information violates at least one behavior standard for the shared resource; and
based on the comparison, perform at least one second remedial action for the user with respect to the shared resource when the second state information both violates at least one behavior standard for the shared resource and fails to conform to the predicted state information.

23. The system of claim 22, wherein the at least one second remedial action includes allowing violation of the behavior for at least a period of time.

24. The system of claim 22, wherein the at least one first remedial action or the at least one second remedial action include determining a current available behavior for the at least one resource and adjusting the user access to the at least one resource to at most the current available behavior.

25. The system of claim 22, wherein the first state information and the second state information are aggregated by a monitoring component, the monitoring component further operable to perform the comparison.

26. The system of claim 22, wherein if the first state information violates the at least one behavior standard, at least one first remedial action is performed before the second state information is determined.

27. A non-transitory computer readable storage medium storing instructions for enforcing behavior standards for users of a shared resource, the instructions when executed by a processor causing the processor to:

determine first state information with respect to at least one protocol parameter for usage of at least one shared resource by a user, the first state information capable of being aggregated from multiple devices providing access to the shared resource;

subsequent to determining the first state information, determine second state information with respect to the at least one protocol parameter for usage of the at least one shared resource by the user, the second state information further capable of being aggregated;

compare the second state information for the user and a predicted state information with respect to the at least one protocol parameter, the predicted state information determined using the first state information; and perform at least one first remedial action for the user with respect to the shared resource when the first state information violates at least one behavior standard for the shared resource; and based on the comparison, perform at least one second remedial action for the user with respect to the shared resource when the second state information both violates at least one behavior standard for the shared resource and fails to conform to the predicted state information.

28. The non-transitory computer readable storage medium of claim 27, wherein the first state information and the second state information are aggregated by a monitoring component, the monitoring component further operable to perform the comparison.

29. The non-transitory computer readable storage medium of claim 27, wherein the at least one first remedial action and the at least one second remedial action include tracking violation of the behavior standard by the user and billing the user an additional amount based at least in part upon the violation.

30. The non-transitory computer readable storage medium of claim 27, wherein the at least one first remedial action and the at least one second remedial action include determining a current available behavior for the shared resource and adjusting access of the user to the shared resource to at most the current available behavior.

* * * * *